No. 749,079. PATENTED JAN. 5, 1904.
J. W. MILLER.
BUTTON BLANK CUTTING MACHINE.
APPLICATION FILED JUNE 6, 1902.
NO MODEL. 4 SHEETS—SHEET 1.
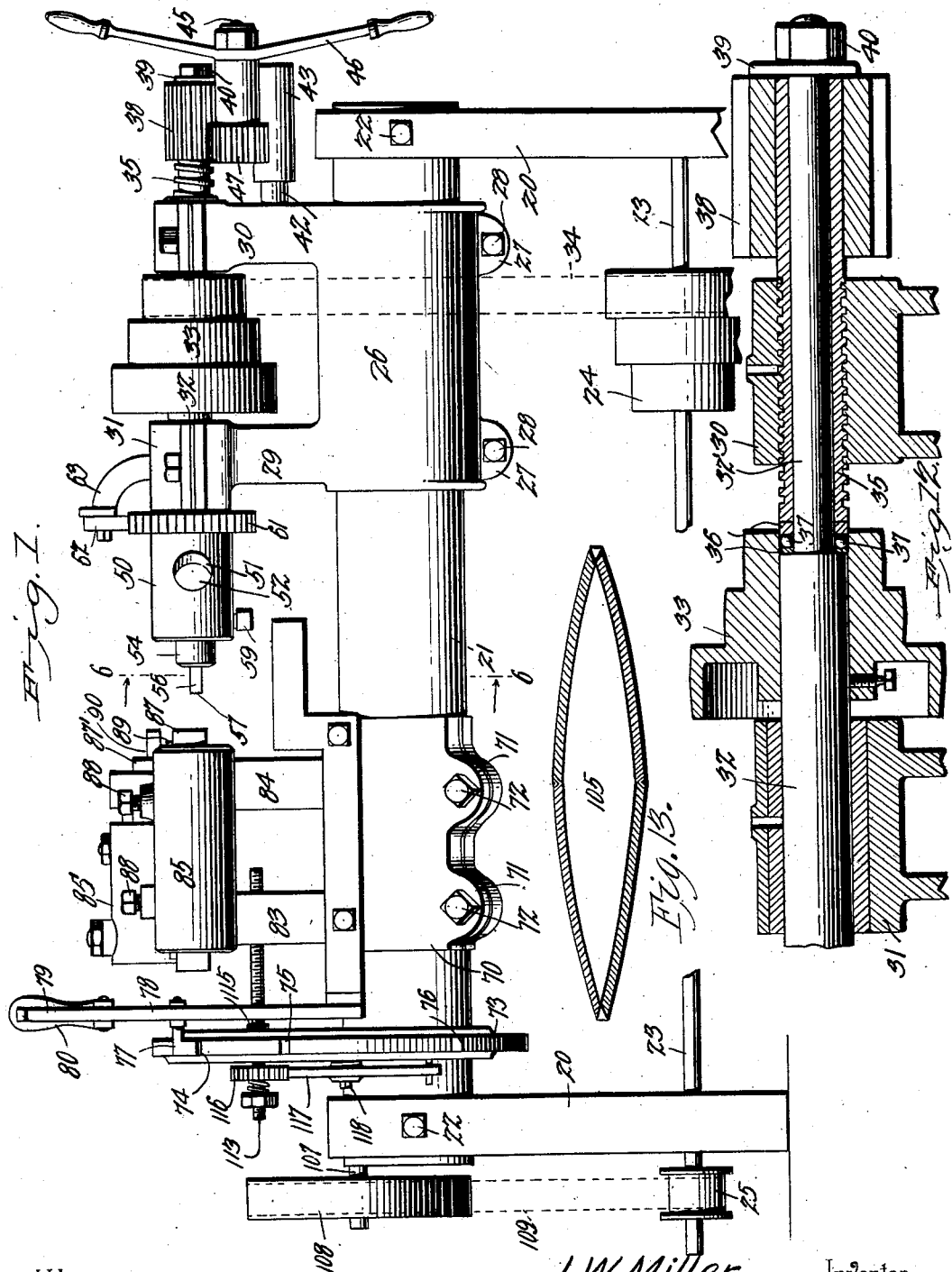

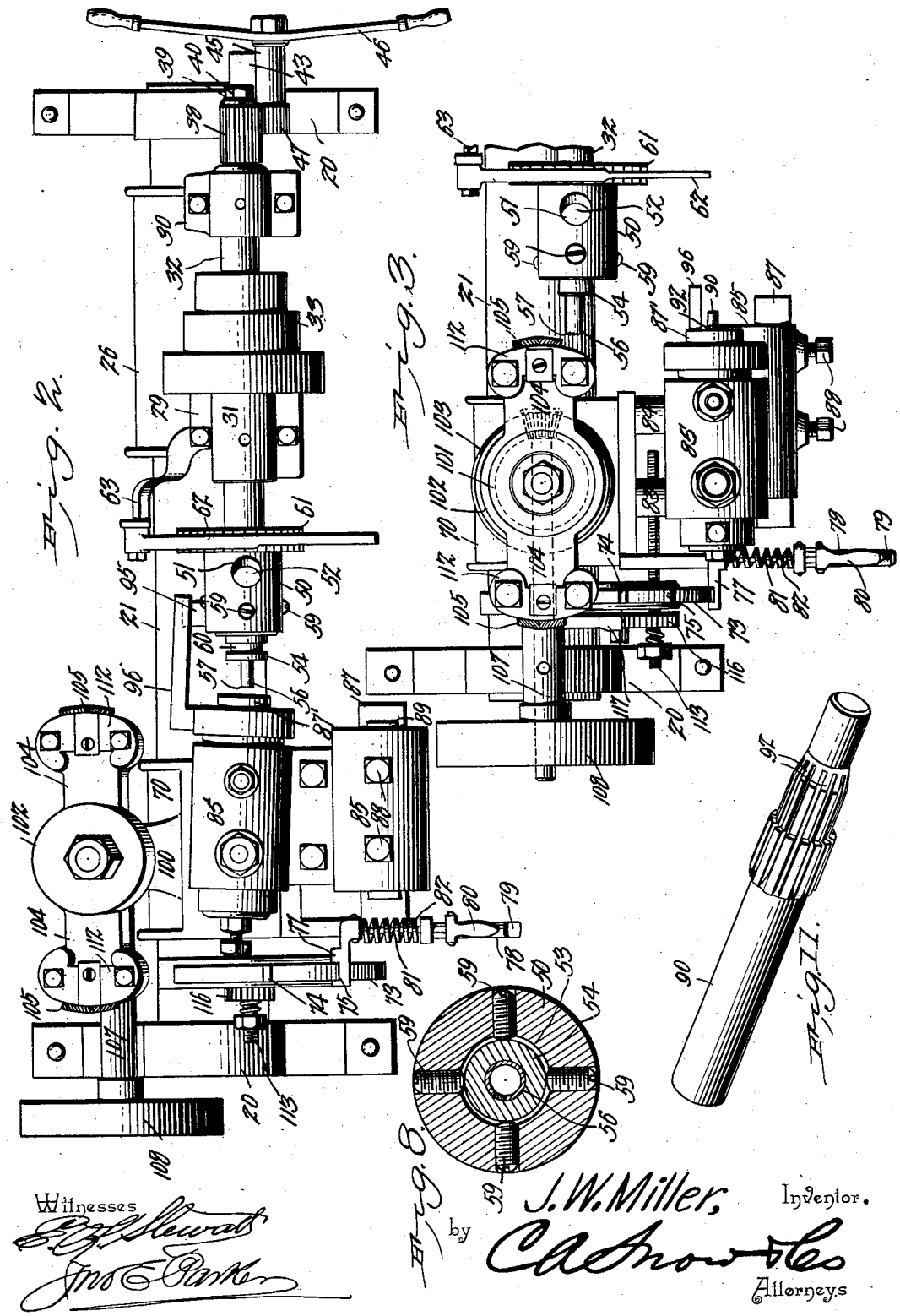

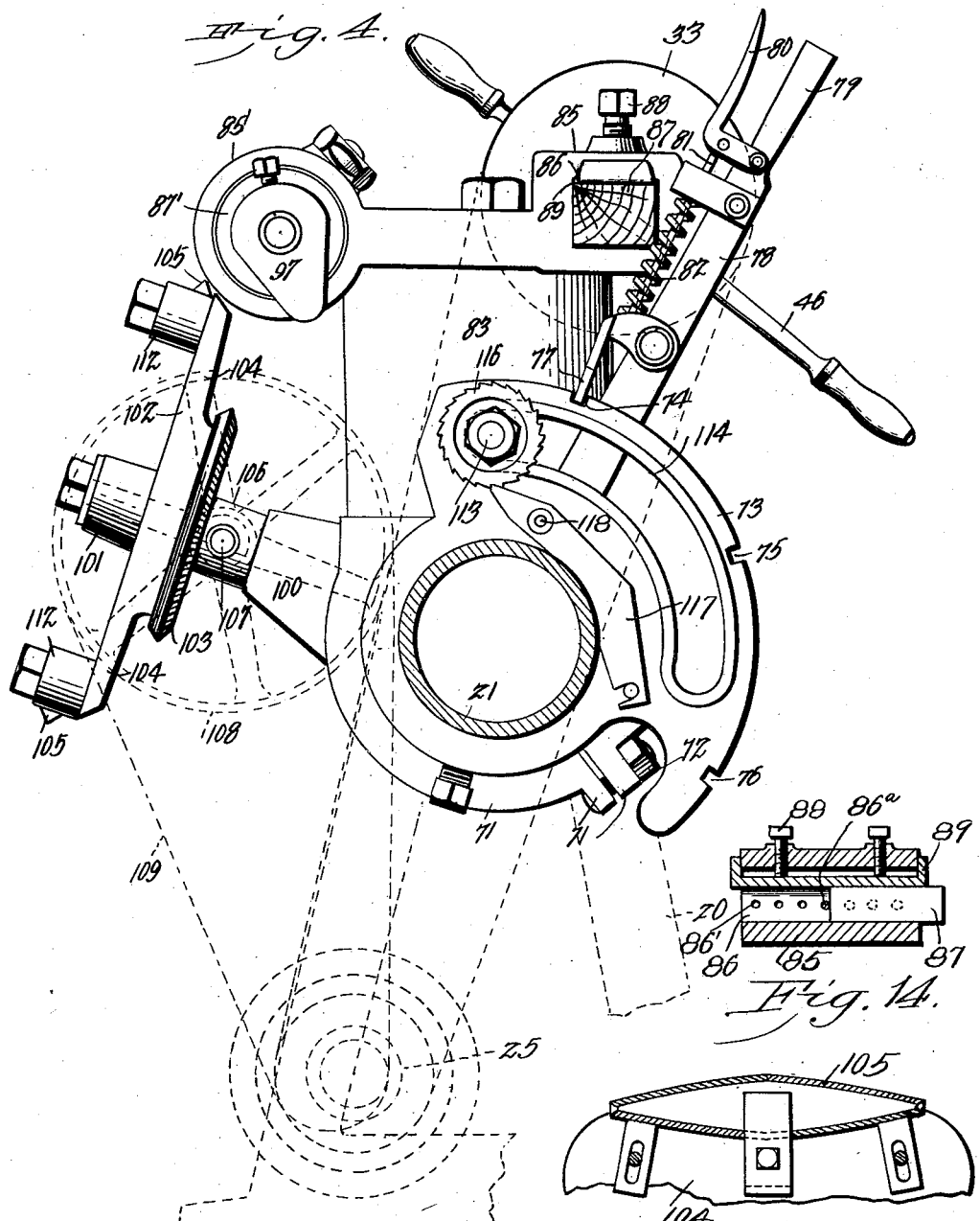

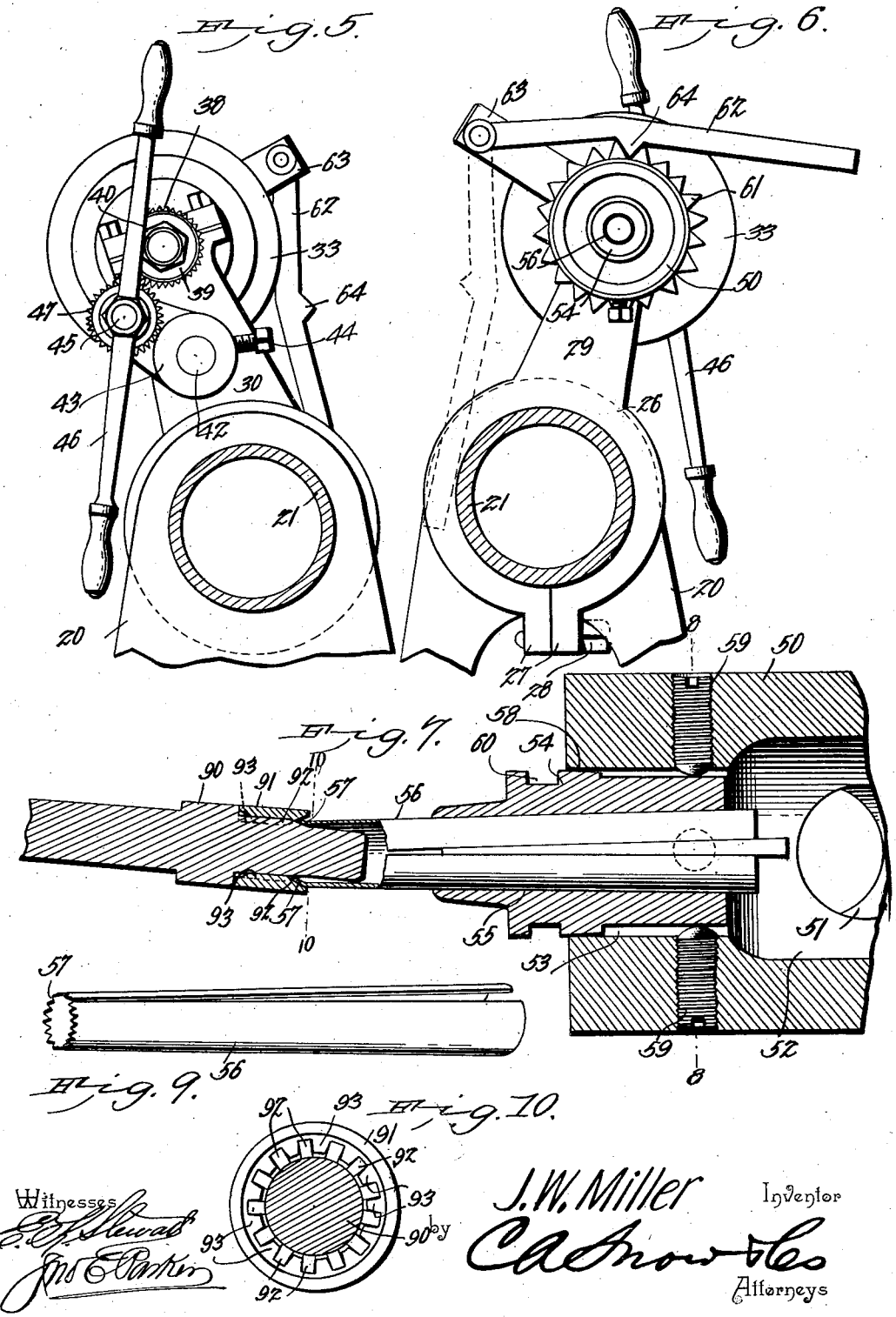

No. 749,079. Patented January 5, 1904.

UNITED STATES PATENT OFFICE.

JOHN W. MILLER, OF MUSCATINE, IOWA.

BUTTON-BLANK-CUTTING MACHINE.

SPECIFICATION forming part of Letters Patent No. 749,079, dated January 5, 1904.

Application filed June 6, 1902. Serial No. 110,522. (No model.)

*To all whom it may concern:*

Be it known that I, JOHN W. MILLER, a citizen of the United States, residing at Muscatine, in the county of Muscatine and State of Iowa, have invented a new and useful Button-Blank-Cutting Machine, of which the following is a specification.

My invention relates to certain improvements in button-cutting machines, and has for its principal object to construct a machine in which the cutting-saw may be sharpened without removal from its supporting-mandrel.

A further object of the invention is to provide a means for setting the teeth of the saw either before or after the sharpening operation.

A still further object of the invention is to so construct the machine as to provide for the ready adjustment of the cutting, setting, and sharpening devices to operative positions and to automatically compensate for the shortening of the saw from wear and from the action of the sharpening-files.

Still further objects of the invention are to provide for the automatic adjustment of the setting-tool to an initial position after each operation, to provide for the automatic starting and stopping of the movement of the saw-files when moved into operative and inoperative position, to provide for the proper spacing of the saw-teeth during the filing operation, to construct an improved form of saw and saw-holding mandrel, and to provide for the accurate adjustment of the mandrel and saw.

With these and other objects in view the invention consists in the novel construction and arrangement of parts hereinafter described, illustrated in the accompanying drawings, and particularly pointed out in the appended claims.

In the drawings, Figure 1 is a front elevation of a button-cutting machine constructed in accordance with my invention, the parts being adjusted to position for cutting button-blanks from the stock. Fig. 2 is a plan view of the machine, the parts being adjusted to position to permit of the operation of the setting mechanism on the teeth of the saw. Fig. 3 is a plan view of a portion of the machine, illustrating the saw-sharpening mechanism adjusted to operative position. Fig. 4 is an end elevation of the machine, drawn to a somewhat larger scale. Fig. 5 is an elevation of a portion of the opposite end of the machine. Fig. 6 is a transverse sectional elevation of the machine on the line 6 6 of Fig. 1. Fig. 7 is an enlarged sectional view through the saw-set and the saw. Fig. 8 is a transverse sectional elevation of the same on the line 8 8 of Fig. 7. Fig. 9 is a detail perspective view of the saw removed from its supporting-mandrel. Fig. 10 is a transverse sectional elevation of the saw-set on the line 10 10 of Fig. 7. Fig. 11 is a detail perspective view of that portion of the saw-set for contact with the inner surfaces of the saw-teeth. Fig. 12 is a longitudinal sectional elevation, on an enlarged scale, through the main spindle and its adjusting and driving mechanism. Fig. 13 is a detail view of one of the sharpening-files. Fig. 14 is a detail sectional view of the cutter-block-supporting device. Fig. 15 is a detail view of the said carrier.

Similar numerals of reference are employed to indicate corresponding parts throughout the several figures of the drawings.

The machine is one of that class employed for cutting button-blanks from mother-of-pearl and similar hard material, where the cutting-saws require frequent sharpening and setting. As ordinarily practiced a dull saw is removed from the machine each time sharpening becomes necessary and a sharpened saw is placed in position, the operation entailing considerable loss of time in effecting the proper adjustment of a new saw. To overcome these and other objections to this class of machinery, I provide for the sharpening and setting of the saw without removal from the machine and also provide for the automatic adjustment of the mechanism to compensate for the shortening of the saw due to the wearing away of the teeth and the removal of material under action of the sharpening-files.

Referring to the drawings, 20 indicates a pair of standards, which may be of any suitable height and serve as a support for a horizontally-disposed tube 21, which forms the bed of the machine, the tube being locked to the standards by set-screws 22 or in any other convenient manner. Near the base of the standards are suitable bearings for the support of a driven shaft 23, to which motion is imparted from any suitable source of power, said shaft being provided with pulleys 24 and 25, over which may pass driving-belts to the saw-actuating spindle and the file-carrier.

The head-stock, which supports the saw and its adjusting and actuating mechanism, is in the form of a split ring 26, surrounding the tube 21 and provided with lugs 27 for the reception of bolts 28, which serve to clamp the ring in proper position on the tube. At the opposite ends of the head-stock are standards 29 and 30, the standard 29 having a bearing 31, Fig. 12, for the support of the main saw-carrying spindle 32, said spindle being provided with a pulley 33, which may be connected by a belt 34 to a pulley 24 on the lower shaft 23. The upper portion of the standard 30 is provided with an internal screw-thread for the reception of a threaded sleeve 35, which is mounted on a reduced portion 32' of the spindle 32, the turning of this sleeve effecting endwise movement of the spindle and its saw. Between the inner end of the sleeve 35 and the shoulder formed between the portions 32 and 32' of the spindle is a suitable thrust-bearing comprising a pair of rings 36, formed of hard metal and forming a ball-race for the reception of antifriction-balls 37. At the outer end of the sleeve 35 is keyed a pinion 38, which is held from endwise movement by a washer 39 and a nut 40 on the end of the portion 32' of the spindle.

On the outer end of the standard 30 is a stud 42 carrying an arm 43, which may be locked to said stud by a set-screw 44. At the outer end of the arm is an enlarged boss forming a bearing for a short shaft 45, having at one end one or more operating-levers 46 and at the opposite end a pinion 47 for engagement with the teeth of the pinion 38, the latter being of considerably greater width than the pinion 47 in order that the teeth may be kept in mesh during endwise movement of the spindle and the pinion 38. When occasion requires, the pinions may be separated by loosening the set-screw 44 and allowing the arm 43 to fall by gravity, said arm swinging downward on the stud 42 as a center.

The inner end of the main spindle 32 is threaded for the reception of a chuck 50, having one or more openings 51, extending from an inner chamber 52 through the walls of the chuck and serving as discharge-outlets for the button-blanks. At the outer end of the chuck is an opening 53, circular in form and having its center coincident with the axis of the mandrel. This opening is adapted for the reception of a saw-mandrel or spun 54, having a centrally-disposed tapering-opening 55, the diameter of which is much greater at the inner than at the outer end of the mandrel. In this tapered opening is placed a saw 56, formed of a rectangular sheet of spring-steel the width of which is slightly less than the circumference of the wall of opening 55, so that when the sheet is bent into the form of a ring and driven into the tapering opening 55 its extreme outer edge will form a continuous ring, while the rear end within the chuck 50 will be of larger diameter, the edges of the sheet being slightly separated and the tapering of the opening resulting in a V-shaped recess or space between the edges of the sheet, as indicated in Fig. 9. In the outer end of the blade are formed suitable saw-teeth 57, these being in the form of a continuous ring and of a pitch corresponding to the character of the work. In order to properly aline the saw, the mandrel is provided with a slightly-inclined shoulder 58, which may be forced into the opening 53, the inner portion of the mandrel being of a diameter less than said opening and the chuck being provided with a series of set-screws 59, the inner ends of which bear upon the periphery of the mandrel and permit of adjustment of the latter. In the outer portion of the mandrel is formed a peripheral groove 60, in which may be inserted a forked tool to effect the withdrawal of the mandrel when it becomes necessary to place a new saw in position.

To the rear end of the chuck or to the spindle 32 is secured a ratchet-wheel 61, Fig. 6, having a number of teeth corresponding to those of the saw, a latch-lever 62, pivoted on a bracket 63, serving to hold the chuck and saw in proper position during the sharpening operation. During the cutting operation the latch-lever is thrown to the rear, its tooth 64 being moved out of engagement with the ratchet-wheel in order to permit free rotation of the latter with the spindle.

On the tube 21 is mounted a tail-stock 70, formed of a split ring having lugs 71, through which pass clamping-bolts 72, which may be employed to clamp the tail-stock rigidly in position or may be used to take up any wear occurring between the tube and tail-stock as the latter is moved either longitudinally or circumferentially during the adjustment of the saw filing or setting mechanism to operative or inoperative position. At a point adjacent to the tail-stock the tube 21 serves as a support for a quadrant 73, which is rigidly locked in position, the curved outer edge of said quadrant being provided with three notches 74, 75, and 76, adapted for the reception of a locking-latch 77, pivoted on an operating-lever 78, which is secured to or formed integral with the tail-stock 70. At the upper end of the lever 78 is a handle 79, and adjacent to the handle is a latch-operating lever 80, connected by a rod 81 to the latch, a spring 82, which surrounds said rod, normally serving to keep the latch in locking engagement with the quadrant. It will be seen that by grasping the lever an adjustment of the tail-stock may be had, the tail-stock moving circumferentially of the tube 21 and being locked in any one of three positions, in accordance with the character of work to be performed.

83 and 84 designate a pair of standards secured to or formed integral with the tail-stock, and on the upper end of said standards is bolted a horizontal frame 85, having at one end a socket 86 for the reception of a cutter-bed 87 for the saw. This cutter-bed is preferably in the form of a block of wood having one end projecting beyond the socket in the direction of the saw, the block being adjustable in its socket and locked in any desired position by set-screws 88. This permits of the employment of a block of wood of considerable length, the cutting-face which comes into contact with the saw being removed or dressed when necessary and the block adjusted in the direction of the saw for a corresponding distance. In order to prevent mutilation of the block, a metallic plate 89 is preferably inserted between the upper face of the block and the end of the set-screws. The cutter-block support may be provided with a plurality of openings 86' to receive the pin 86ª, forming a stop for limiting movement of the block and holding it against the action of the saw. The operative position of the block is that indicated in Figs. 1 and 4, the center of said block being in direct alinement with the longitudinal axis of the saw and the locking-latch 77 being in engagement with the quadrant notch or recess 74. At the opposite end of the frame 85 is a circular socket 85', arranged in the form of a tube or sleeve, the longitudinal axis of which is arranged in an angular plane about five degrees, more or less, from that in which the longitudinal axis of the saw is situated. In this tubular socket is mounted a revoluble sleeve 87', having at one end a socket or chuck for the reception of a pair of saw-sets, the construction of which is more clearly illustrated in Figs. 7, 10, and 11. The saw-setting device comprises two members 90 and 91, one of which fits within the other and adapted for contact, respectively, with the inner and the outer faces of the saw. The end of the cylindrical saw-set 90 is less in diameter than the internal diameter of the saw and when first entered in the saw serves to push the button-blanks rearwardly into the chuck. At a point some distance from the end of the saw-set is a series of projected ribs spaced at equidistant intervals around the surface of the cylinder and of a number equal to one-half of the number of teeth in the saw, the ribs being adapted to act in such manner as to force alternate teeth outwardly. The ribs 92 are tapered at their outer ends in order to facilitate the setting operation, the saw being forced gradually in the direction of the setting-tool until the teeth have acquired the desired inclination. On the cylindrical member 90 is mounted the sleeve 91, having inwardly-projecting parallel ribs 93 of a number equal to the ribs 92, the ribs of one member fitting in the spaces between the ribs of the opposite member and serving as a convenient means of interlocking the two to prevent independent movement. The ribs 93 of the sleeve are inclined and are adapted to act on the outer surfaces of alternate teeth of the saw in precisely the same manner that the inclined ribs 92 act on the inner faces of alternating teeth, and for convenience the ribs are tapered at each end of the sleeve, so that said sleeve may be readily reversed when the ribs of one have become worn or burred. In the operation of this portion of the mechanism the tail-stock is shifted by the lever 78 until the setting-tool is in alinement with the saw, the tail-stock being then locked in position by the engagement of the latch 77 in the notch 75 of the quadrant. The main spindle is then rotated to revolve the saw, and the saw is fed forward by the threaded sleeve 35 until a dog 95 on the chuck engages a dog 96, depending from the inner end of the sleeve 87', the latter being then rotated with the chuck and saw. The operating-handle is turned until the saw enters the setting-tool, and as the latter is rotating and is disposed at an angle to the axis of the saw the teeth of the saw will be rolled to effect the setting operation, the ribs of the two members of the setting-tool acting alternately on alternate teeth until the teeth have been given the desired inclination. Before the engagement of the teeth of the saw with the setting-ribs the extreme end portion of the cylindrical member 90 enters the saw and forces the button-blanks to the rear, leaving the saw-teeth clear for the setting and filing operations. When the saw is moved to the rear and is disengaged from the setting-tool, the weight of the dog 96 and an additional counterweight 97, Fig. 4, carried by the sleeve 87', serves to turn the sleeve to its initial position, so that at each operation the setting-ribs will be properly guided to engage the same teeth, preliminary adjustment of the dogs 95 and 96 insuring this result.

On the rear of the tail-stock is a lug 100, having at its outer end a stationary spindle 101, on which is mounted a rotatable file-carrier 102. The file-carrier has a central hub portion, to which is secured a bevel-gear 103 and is provided with two radially-extending arms 104, carrying clamps for the reception of files 105 of the character more clearly shown in Fig. 13. The lug 100 is provided with an elongated bearing 106 for the support of a shaft 107, which extends beyond the line of the outer frame and carries a pulley 108, over which passes a belt 109, receiving motion from the pulley 25 of the shaft 23. When the saw-filing mechanism is in the position shown in Fig. 4, the belt 109 hangs loosely, its lower portion sagging below the pulley 25 and the latter, while revolving, imparting no motion to the belt. When the tail-stock is adjusted to the position shown in Fig. 3 by moving the lever 78 until the latch 77 engages the quadrant-notch 76, the belt is held taut between the two pulleys and the file-carrier is rotated, being brought into operative contact with the saw between adjacent teeth, while the saw is rotated by hand and is held in locked position during the filing of each tooth by the engagement of the latch-lever 62 with the ratchet-wheel 61, as shown in Fig. 6. The files, as shown in Fig. 13, are each in the form of an elongated flat plate, widest at the center and terminating in comparatively sharp points at each end. The edges from the center to each end are each of the same curvature; but the lines are so drawn that when one arc is concentric to the center of the spindle 101 the arcuate line representing the remaining half of the file will be at a tangent. This construction permits of the use of each file four different times, the file being held by suitable clamps 112 at the outer ends of the arms 104 and properly adjusted with respect to the teeth of the saw.

In order to automatically compensate for the wear of the saw-teeth and the metal removed from the saw by the files and to insure the retention of the saw-teeth at precisely the same distance from the cutter-block after each filing or sharpening operation it becomes necessary to move the tail-stock and all of its connected parts in the direction of the saw. To accomplish this, I employ a screw 113, the threaded ends of which pass through the tail-stock standard 83, the opposite ends of said screw passing through a segmental slot 114 in the quadrant 73 and the screw being held from longitudinal movement by a fixed collar 115, bearing against the inner face of the quadrant and a ratchet-wheel 116, secured to the outer end of the screw and bearing against the outer face of the quadrant. With this ratchet-wheel engages a pawl 117, mounted on a stud 118 on the outer face of the quadrant, and as the latter is stationary the downward movement of the tail-stock in adjusting the setting-tool or the sharpening-files to operative position causes the ratchet-wheel to move past the pawl and turn the feed-screw. In this manner the tail-stock and all of its connected parts are moved a slight distance toward the head-stock. It will be apparent that by placing the quadrant at the opposite end of the machine and making the head-stock movable and the tail-stock rigid the saw may be adjusted to positions opposite the cutter-block, the setting device, or the sharpening saw.

While the construction herein described and illustrated in the accompanying drawings is the preferred form of the device, it is obvious that various changes in the form, proportions, size, and minor details of the structure may be made without departing from the spirit or sacrificing any of the advantages of my invention.

Having thus described the invention, what I claim is—

1. In a device of the class specified, a crown-saw, a cutter-block, a saw-sharpening device, and means for adjusting the mechanism to bring either the cutter-block or the sharpening device into coöperative relation with the saw.

2. In a device of the class specified, a saw, a cutter-block, a saw-sharpener, and adjusting means for permitting the coöperation of either the cutter-block or the sharpening device with the saw.

3. In a device of the class specified, the combination with a saw, of a saw-setting device, a saw-sharpening device, and adjusting means for permitting the action of either of such devices on the saw.

4. In a device of the class specified, a saw, a cutter-block, a saw-set, and adjusting means for permitting the coöperation of the cutter-block or the saw-set with said saw.

5. In a device of the class specified, a saw, a cutter-block, a saw-set, a saw-sharpening device, and adjusting means for permitting the coöperation of the cutter-block, the saw-set or the sharpening device with said saw.

6. In a device of the class specified, a saw, a cutter-block, a saw-set, a saw-sharpening device, and means for adjusting all of such devices into operable relation with said saw.

7. The combination with a saw, of a cutter-block, a saw-sharpening device, means for adjusting either the cutter-block or sharpening device to operative position, and means for automatically starting and stopping the driving mechanism of said sharpening device.

8. In a device of the class specified, the combination with a crown-saw, of a cutter-block, a saw-setting device, a saw-sharpening device, and means for automatically starting and stopping the operation of both of said devices.

9. In a device of the class specified, the combination with a crown-saw, of a cutter-block, a saw-set, a saw-sharpening device, means for adjusting the saw-set and sharpening device to operative position, means for automatically starting the operative movement of both the saw-set and the sharpening device when adjusted to operative position, and means for automatically stopping the movement of said devices when returned to inoperative position.

10. In a device of the class specified, a crown-saw, a cutter-block, a saw-set, a saw-sharpening device, a support carrying the cutter-block, the saw-set and the sharpening device, and means for adjusting said support.

11. In a device of the class specified, the combination of the cutter-block, a crown-saw, a spindle for revolving the same, a threaded shaft connected to said spindle, a stationary nut for the reception of said shaft, a gear carried by said threaded shaft, and a revoluble pinion intermeshing with said gear, substantially as specified.

12. In a device of the class specified, the combination with a cutter-block, of a crown-saw, a revoluble spindle connected to the saw and having an end portion of reduced diameter, a threaded hollow shaft surrounding the reduced portion of the spindle, a roller thrust-bearing between the end of the hollow shaft and the adjacent portion of the spindle, means for rotating the spindle, a stationary nut engaging the hollow shaft, a gear secured to said hollow shaft, and a hand-actuated pinion intermeshing with said gear.

13. In a device of the class specified, the combination with a cutter-block, of a crown-saw, a spindle connected thereto, means for rotating the spindle, a hollow shaft surrounding a portion of the spindle and having a threaded periphery, a stationary nut engaging the threaded shaft, a gear secured to the threaded shaft, a hand-operated pinion intermeshing with said gear, a stud carrying the pinion, and an adjustable bracket supporting said stud.

14. In a device of the class specified, the combination with a crown-saw, of a cutter-block support having a plurality of pin-receiving openings, an adjustable cutter-block therein, and a pin adapted to said openings to hold the block against the action of the saw.

15. The combination with a crown-saw, of a cutter-block support, a wooden cutter-block adjustably mounted in the support, a metallic clamping-plate engaging said block, and clamping-screws carried by the support and adapted for contact with said plate to hold the block in adjusted position.

16. In a device of the class specified, the combination with a cutter-block, of a crown-saw, a saw-mandrel having a tapering annular flange, a chuck having a mandrel-receiving opening into which the flange extends, and adjusting-screws carried by the chuck and engaging the rear portion of the mandrel to assist in centering the same.

17. The combination with a crown-saw, of a cutter-block, a saw-carrying chuck, means for rotating the same, a revoluble setting device, an adjustable means for interlocking the chuck and the setting device and for insuring the proper relation of the setting device and the saw.

18. The combination with a crown-saw, of a cutter-block, a saw-carrying chuck, means for rotating the same, a revoluble setting device adapted to engage with the saw, and interengaging dogs carried by the chuck and the setting device whereby the rotative movement of the chuck is imparted to said setting device.

19. The combination with a crown-saw, of a cutter-block, a saw-carrying chuck, means for rotating the same, a saw-setting device, a counterweight for insuring the return of the setting device to an initial position after each operation, and means for effecting the engagement of the chuck and setting device.

20. The combination with a crown-saw, of a cutter-block, a revoluble chuck, means for revolving the same, a revoluble setting device, adjustable dogs carried by the setting device and adapted to engage when one is moved in the direction of the other, and means for returning the setting device to an initial position after each operation.

21. The combination with a crown-saw, of a cutter-block, a revoluble file-carrier, means for operating the same, a file secured to the carrier, and means for adjusting the file-carrier and saw into operative position.

22. In a device of the class specified, the combination with a cutter-block, of a crown-saw, a revoluble file-carrier, means for operating the same, a file secured to the carrier, means for adjusting the file-carrier and saw into operative position, and means for automatically starting the operative movement of the file-carrier when the same is moved to operative position.

23. In a device of the class specified, the combination with a crown-saw, of a cutter-block, a file-carrier, a file secured thereto, means for revolving the file-carrier, and means for locking the saw to present successive teeth to the action of the file.

24. In a device of the class specified, the combination with a crown-saw, of a cutter-block, a file-carrier, a gear-wheel secured thereto, a pinion intermeshing with said gear-wheel, a shaft carrying said pinion, an adjustable supporting device for said shaft, said supporting device being movable to adjust the file-carrier to operative and inoperative position, a belt-wheel mounted on the shaft, and a driving-shaft having a belt-wheel and belt so located that when the file-carrier is in inoperative position the belt will be loose and when in operative position said belt will be taut.

25. The combination with a saw, of a cutter-block, a saw-filing device, a carriage therefor, and means for automatically moving one of such devices in the direction of the other after each filing operation.

26. The combination with a saw, of a cutter-block, a saw-filing device, and means for automatically moving one toward the other after each sharpening operation for a distance corresponding to the amount of material removed by the file.

27. The combination of the bed, a saw, a tail-stock mounted for locking movement on the bed and adjustable longitudinally thereof, a cutter-block, a saw-set and a saw-filing device all carried by the tail-stock and adjustable by the movement of the latter to operative position, an actuating-lever secured to the tail-stock, a notched segment carried by the bed and having a segmental slot, a threaded shaft having guiding-collars on each side of the segment and extending through a threaded opening in the tail-stock, a ratchet-wheel secured to said threaded shaft, and a pawl pivoted to the segment and adapted to engage said ratchet-wheel.

28. In a device of the class specified, the combination of the supporting-standards, a tubular bed carried thereby, a head-stock secured to the bed, a revoluble crown-saw carried by the head-stock, a tail-stock mounted for rocking movement on said bed, a cutter-block, a saw-set and a saw-sharpening device all carried by the tail-stock and adjustable therewith, an actuating-lever secured to the tail-stock, a slotted locking-segment rigidly secured to the bed and having peripheral notches, a latch-lever carried by the actuating-lever and adapted to engage in said notches for holding the tail-stock in adjusted position, a threaded shaft adapted to a threaded opening in the tail-stock and extending through the segment-slot, guiding-collars carried by the shaft on each side of the segment, a ratchet-wheel carried by the shaft, and a pivoted pawl mounted on the segment and adapted to engage said ratchet-wheel.

In testimony that I claim the foregoing as my own I have hereto affixed my signature in the presence of two witnesses.

JOHN W. MILLER.

Witnesses:
LOUIS R. HEITZ,
J. M. BENHAM.